United States Patent [19]

Bell, III et al.

[11] 3,937,889
[45] Feb. 10, 1976

[54] DATA COMMUNICATION APPARATUS FOR USE IN A TELEPHONE SYSTEM

[75] Inventors: William W. Bell, III, Sands Point; Peter K. Shizume, Hicksville, both of N.Y.

[73] Assignee: Sperry Rand Corporation, New York, N.Y.

[22] Filed: Jan. 15, 1973

[21] Appl. No.: 323,563

[52] U.S. Cl. ............ 179/2 DP; 179/2 A; 177/2 AS; 179/5 R
[51] Int. Cl.² ...................................... H04M 11/00
[58] Field of Search ......... 179/5 R, 5 P, 2 A, 2 DP, 179/18 E, 18 BB; 329/122

[56] References Cited
UNITED STATES PATENTS

| | | | |
|---|---|---|---|
| 2,568,342 | 9/1951 | Koehler | 179/5 R |
| 2,911,474 | 11/1959 | Weinberg | 179/5 R |
| 3,111,625 | 11/1963 | Crafts | 329/122 |
| 3,387,091 | 6/1968 | Deiker | 179/5 R |
| 3,404,236 | 10/1968 | Halaby | 179/5 R |
| 3,436,487 | 4/1969 | Blane | 179/2 DP |
| 3,484,553 | 12/1969 | Lovell | 179/5 R |
| 3,492,426 | 1/1970 | Foreman | 179/5 R |
| 3,505,474 | 4/1970 | Quatse | 179/2 DP |
| 3,575,556 | 4/1971 | Wolf | 179/2 DP |
| 3,598,917 | 8/1971 | De Raedt | 179/5 R |
| 3,697,693 | 10/1972 | Deschenes | 179/2 DP |

*Primary Examiner*—Kathleen H. Claffy
*Assistant Examiner*—George G. Stellar
*Attorney, Agent, or Firm*—Howard P. Terry; Albert B. Cooper

[57] ABSTRACT

A data transmission system utilizing the telephone voice communication network for transmitting data between the location of a telephone subscriber's handset and a central station. A data transmitter is capacitively coupled to a bridge tap on the subscriber loop at the subscriber's handset and a data receiver is capacitively coupled to a bridge tap on the subscriber loop at the associated telephone company central office. The data transmissions occur at frequencies outside the standard telephone voice transmission frequency band of the system thereby providing continuous data transmission service without interfering with the normal voice communication function of the system.

6 Claims, 4 Drawing Figures

DATA COMMUNICATION APPARATUS FOR USE IN A TELEPHONE SYSTEM

BACKGROUND OF THE INVENTION

1. Field of the Invention

The invention relates to data communication utilizing the telephone voice communication network.

2. Description of the Prior Art

The telephone communication network has been utilized in the prior art not only for the usual voice communication function but also to transmit non-voice data. For example, equipment is commercially procurable that may be utilized with the conventional telephone handset for the transmission of documents over the telephone wires from one handset to another. These prior art devices operate within the standard telephone voice transmission frequency band and interfere with the use of the lines for voice communication while the non-voice data is being transmitted. Additionally, many of these devices require that the telephone handsets between which the data is being transmitted be in the "off-hook" state and connected through the telephone system switching matrices.

The conventional telephone communication network is also utilized for the transmission of data in data processing computer systems. Such signalling also utilizes frequencies within the standard telephone voice transmission frequency band normally precluding simultaneous use of the system for voice communication. In such systems, the terminals are interconnected with one another through the telephone company switching matrices with the telephone transmitters and receivers effectively in the "off-hook" state during the transmission of data. Additionally, such systems often utilize leased lines which add to the cost of the facilities. Data transmission over such leased lines is also effected within the standard telephone voice transmission frequency band of the system.

The conventional telephone communication network is also utilized for transmitting control signals, for example in a traffic control system or for the monitoring of instruments from a central location, such as is often required by utility companies. All such installations utililze the telephone communication network at frequencies within the standard telephone voice transmission frequency band of the telephone system. When data is transmitted over such installations, normal telephone voice communication is usually precluded and, conversely, when it is desired to use the lines for voice communication, data transmission and monitoring is terminated. Such systems often utilize leased telephone lines for the data transmission function which adds to the cost of the system.

SUMMARY OF THE INVENTION

It is the primary object of the present invention to provide a data communication system utilizing the existing telephone voice communication network such that data may be continuously transmitted without interfering with the normal voice communication function of the system.

This object is achieved by a data transmitter coupled to a subscriber loop for transmitting data signals thereon at frequencies outside the standard telephone voice frequency band of the system. A data receiver is coupled to the subscriber loop at another location for receiving the data signals. The transmitter may, for example, be connected to a bridge tap at a subscriber telephone handset and the receiver may be coupled to a bridge tap at the telephone company central office. The data provided by receivers utilized in the invention may be concentrated at apparatus in the vicinity of the telephone company central office and transmitted on a leased line to a central monitoring station whereat the data may be distributed to the end users.

DESCRIPTION OF THE PREFERRED EMBODIMENT

Figure 1:
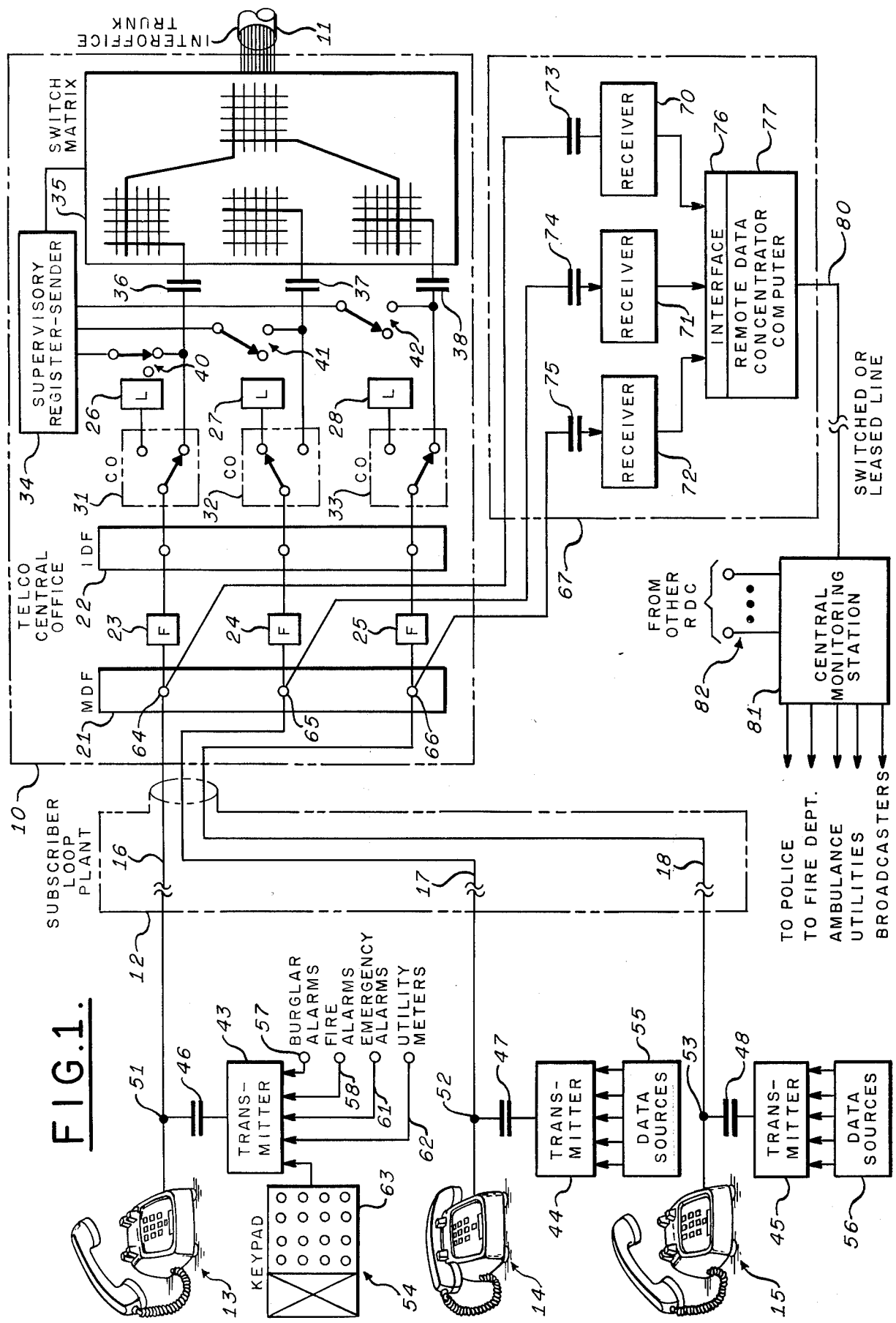
FIG. 1 is a schematic block diagram of a portion of a conventional telephone voice communication system with data transmission apparatus included in accordance with the present invention.

The conventional public telephone system largely comprises a plurality of telephone company central offices each central office servicing a plurality of telephone company subscribers. Normally, a subscriber's telephone handset is connected with the associated central office by a subscriber loop comprising a pair of wires dedicated to the use of that subscriber. A plurality of subscriber loops connecting subscribers to a central office is designated as a subscriber loop plant. In normal operation, when a telephone is "on-hook" the subscriber loop is terminated by an open circuit at the subscriber's handset and is shunted by a line relay field winding and d.c. power source at the telephone company central office. When a telephone handset is lifted "off-hook", for example, to place a call, a connection is made across the line pair of the subscriber loop at the telephone handset which draws d.c. current through the line relay field winding and provides d.c. power for the telephone handset microphone and receiver. The line relay activates a cutoff relay which switches the associated subscriber loop at the central office to the central office switching matrix and also connects the supervisory circuits into the loop for the purpose of receiving dialing signals so that a connection may be effected to another telephone location. Connections between handsets associated with a particular telephone company central office is made through the central office switching matrix. The central office switching matrices are in turn interconnected by interoffic trunk lines which provide connections between subscribers from different central offices.

Since the subscriber loop plants of the public telephone system represent hardwire connections from substantially every business office and household to the telephone company central offices, it would be desirable to utilize these existing connections to provide a wide range of data services to the telephone company's private and commercial subscribers. It would further be desirable that these services be provided on a continuous basis, i.e. whether the telephone handset is on-hook or off-hook and without interference from the normal voice and ringing signals utilized in the system. It is furthermore desirable that the data communication function be provided without interfering with the normal voice communication function of the system.

The present invention provides means for transmitting data signals on the subscriber loop plant concurrently with voice signals on a mutually non-interfering basis in a manner hereinafter to be described. A wide range of data services may be provided to the subscribers. For example, burglar, fire and other security alarms may be transmitted from subscriber households and business offices and distributed to appropriate end users such as police and fire departments. Ambulance alarms may similarly be transmitted. Readings from utility company meters for, for example, power, fuel or water, may be transmitted to the utility companies by means of the present invention. Each time a specific quantity of, for example, electricity flows through the power meter, a pulse may be transmitted by means of the present invention to the utility company whereat such pulses may be counted to provide readings for billing purposes.

The present invention may also be utilized to provide responses from subscribers to queries posed on t.v. or radio, the responses being transmitted to the broadcasters. A large number of additional data services may be provided to telephone company subscribers and will not be further discussed here for brevity. It is appreciated that these data services should be provided on a continuous and non-interfering basis with respect to the normal voice communication function of the system. For example, a security alarm function would be seriously compromised if it were necessary to interrupt the data transmission during voice communication.

Referring now to FIG. 1, a portion of a conventional telephone communication network is illustrated incorporating data communication apparatus in accordance with the present invention. The telephone network includes a plurality of telephone company central offices, one of which being indicated at 10. The telephone company central office 10 is interconnected with other central offices in the system by interoffice trunk lines 11. A subscriber loop plant 12 is included for interconnecting the subscriber telephone handsets with the central office 10. Normally, a telephone company central office services thousands or tens of thousands of telephones, three of which are typified at 13, 14 and 15. The telephones 13, 14 and 15 are connected with the central office 10 via subscriber loops 16, 17 and 18 respectively. Each of the subscriber loops 16, 17 and 18 actually comprises a pair of wires, as previously discussed, and is illustrated as a single line for simplicity.

The telephone company central office 10 includes a main distribution frame 21 to which the subscriber loop plant 12 is connected. The telephone company central office 10 also includes an intermediate distribution frame 22 to which each of the subscriber loops at the main distribution frame 21 are coupled via low pass filters for reasons to be discussed. For example, the subscriber loops 16, 17 and 18 are coupled to the intermediate distribution frame 22 via filters 23, 24 and 25. The telephone company central office 10 also includes line relays associated with the subscriber loops respectively, the field windings of the line relays associated with the subscriber loops 16, 17 and 18 being illustrated at 26, 27 and 28. Another portion of the telephone equipment located at the central office 10 comprises cutoff relays 31, 32 and 33 associated with the subscriber loops 16, 17 and 18, respectively. When a telephone is on-hook, its associated subscriber loop is terminated by an open circuit at the telephone handset and via the contacts of the associated cutoff relay by the field windings of the associated line relay at the central office 10. For example, the telephone 14 is illustrated on-hook and the associated subscriber loop 17 is connected through the contacts of the cutoff relay 32 to the line relay field windings 27. When a telephone is lifted off-hook to place a call, the line relay is energized activating the cutoff relay to disconnect the line relay field windings from the subscriber loop. For example, the telephone 13 is illustrated off-hook with the subscriber loop 16 disconnected from the line relay field windings 26 via the cutoff relay 31.

The telephone company central office 10 also includes a switch matrix 35 comprising the switching relays for establishing desired telephone connections. Also included are switches 40, 41 and 42 controlled by a supervisory register-sender 34 located at the central office for switching the supervisory register-sender 34 into the subscriber loops 16, 17 and 18. Impedance bridge capacitors 36, 37 and 38 or alternatively repeat coils are included to provide the ring-back signals to a calling party's handset in a conventional manner.

When a telephone is first lifted off-hook to place a call and the line relay is energized, the cutoff relay connects the associated subscriber loop to the switch matrix 35 and by means of conventional apparatus not shown, connects the supervisory register-sender 34 into the loop via the associated switch 40-42. For example, when the telephone 14 is first lifted off-hook, the line relay field windings 27 are energized causing the cutoff relay 32 to switch the subscriber loop 17 to the switch matrix 35 and to connect the supervisory register-sender 34 to the loop 17 via the switch 41. Dial tone is then returned to the telephone 14 by the supervisory register-sender 34 in preparation for the receipt of dialing signals.

Further to the example given above, when the telephone 14 is first lifted off-hook the subscriber loop 17 is connected via the cutoff relay 32 and the switch 41 to the supervisory register-sender 34 preparatory to the transmission of dialing signals. In response to the dialing signals from the telephone 14, the supervisory register-sender 34 controls the relays of the switch matrix 35 to effect the desired connection. After the dialing sequence is completed the supervisory register-sender 34 disconnects from the loop 17 via the switch 41. When a subscriber serviced by the central office 10 desires to call the telephone of another subscriber serviced by the same central office, the connection is made through the switch matrix 35. Such a connection is shown between the telephones 13 and 15. When a subscriber serviced by the central office 10 desires to call a telephone serviced by another central office, the connection is made through the switch matrix 35 via the interoffice trunk 11 connecting to that central office.

When a telephone of the system receives a call, the supervisory register-sender 34 switches the cutoff relay of the called telephone to connect the associated subscriber loop thereto. The supervisory register-sender 34 then applies a 100 volt, 20 Hz ringing signal to the called subscriber loop causing the called telephone to ring. When the called telephone is lifted off-hook, the supervisory register-sender 34 is disconnected from the called subscriber loop. For example, if a subscriber calls the telephone 14, the supervisory register-sender 34 switches the cutoff relay 32 to connect the subscriber loop 17 thereto via the switch 41. The supervisory register-sender 34 then applies the ringing signal to the subscriber loop 17 causing the telephone 14 to ring. When the telephone 14 is lifted off-hook the supervisory register-sender 34 positions the switch 41 to disconnect the supervisory register-sender from the subscriber loop 17 thereby providing an unencumbered connection.

It will be appreciated that the structure and operation described above with respect to FIG. 1 represents a portion of a conventional telephone voice communication network which has been discussed only in the detail necessary to explain the invention. It is understood that the public telephone system includes other portions (not shown) well known to those skilled in the art.

In accordance with a preferred embodiment of the invention, data transmitters 43, 44 and 45 are coupled through capacitors 46, 47 and 48 to bridge taps 51, 52 and 53 on the subscriber loops 16, 17 and 18 of the subscriber telephones 13, 14 and 15, respectively. Each of the data transmitters 43, 44 and 45 is responsive to data sources 54, 55 and 56 respectively. Each of the data sources, for example 54, may comprise security alarm sensors such as a burglar alarm sensor and a fire alarm sensor applied on lines 57 and 58, respectively. Emergency alarms may also be provided as inputs to the transmitter 43 on, for example, a lead 61. An emergency alarm may for instance be utilized to summons an ambulance.

The data transmitter 43 may also be utilized for communicating utility meter readings applied to a lead such as 62. Sensors at a utility meter, for example an electric flow meter, may provide a pulse on the lead 62 for each 100 kilowatt-hour of electrical power that flows through the meter. The data sources 54 may also include a subscriber response keypad 63.

Thus it is appreciated that the transmitter 43 will transmit status information derived from sensors such as burglar, fire and equipment alarms; discrete information such as might be derived from utility meters or event detectors; or more sophisticated coded information such as might be derived from the keypad 63. It is understood that the data sources illustrated and discussed are merely exemplary of the wide range of information signals that may be transmitted in accordance with the present invention. These data signals are transmitted by the transmitter 43 through the capacitor 46 to the bridge tap 51 on the subscriber loop 16.

The data signals capacitively coupled by the transmitters 43, 44 and 45 onto the subscriber loops 16, 17 and 18 are tapped therefrom at the main distribution frame 21 in the central office 10 by means of bridge taps 64, 65 and 66 respectively. The bridge taps 64, 65 and 66 may be similar to those presently used by telephone answering services. The bridge taps 64, 65 and 66 are brought out from the central office 10 to an adjacent room or building 67 where data communication receivers 70, 71 and 72 are coupled to the bridge taps through capacitors 73, 74 and 75 respectively.

The received data from the receivers 70, 71 and 72 are applied through an appropriate interface network 76 to a remote data concentrator computer 77. The remote data concentrator computer 77 is a conventional commercially procurable data processing minicomputer programmed in a well known manner to perform the functions of scanning the data inputs from the receivers 70, 71 and 72, processing the received information by re-formatting and concentrating the data and storing the processed information.

The processed data from the computer 77 is transmitted in a conventional manner on a switched or leased line 80 to a central monitoring station 81. The computer 77 relays information requiring immediate attention such as security alarms or subscriber response signals to the central monitoring station 81 and stores other information for later recall on request from the monitoring station 81. The central monitoring station 81 is a conventional data handling installation for distributing the data received on the line 80 to appropriate users such as police and fire departments, ambulance services, public utilities or t.v. and radio broadcasters. Data from other remote data concentrator computers associated with other telephone company central offices are received on lines 82 by the central monitoring station 81 for distribution.

Figure 2:
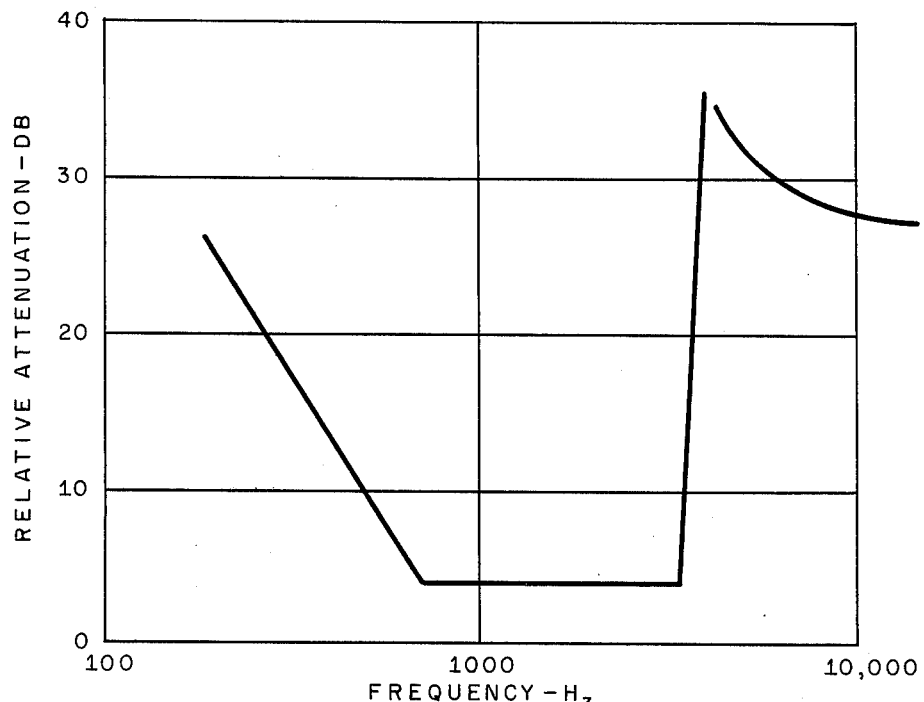
FIG. 2 is a graph illustrating the electroacoustic response of a conventional telephone handset receiver.

The conventional telephone voice communication system is designed for signal transmission throughout the network in the standard telephone voice transmission frequency band of 200 to 3,000 Hz. For example, interoffice trunk lines such as 11 are often loaded facilities or have repeat coils at points along their lengths. Loaded telephone lines block all signals above 4,000 Hz. Repeat coils are tuned transformers which block signals outside the 200 to 3,000 Hz frequency band. The presence of voice amplifiers or carrier systems in long distance trunk connections also reject all signals outside the 200 to 3,000 Hz band. Additionally, the typical telephone handset receiver is most sensitive to the standard telephone voice transmission band having an electro-acoustic response that extends from 200 to 4,000 Hz. FIG. 2 is a graph of relative attenuation in dB versus frequency in Hz for a typical telephone handset receiver. It is noted that the telephone receiver is substantially insensitive to signals below 200 Hz and above 4,000 Hz. Thus, it is appreciated that normal voice telephone transmissions occur in the frequency range from 200 to 3,000 Hz with the exception of the ringing signal which occurs at 20 Hz. All other normal signals such as supervisory signals are contained in this 2800 Hz band.

Referring still to FIG. 1, in the preferred embodiment of the invention the data transmitters 43-45 and the data receivers 70-72 operate in the frequency band from 4 KHz to 50 KHz. As previously described, the data transmission of the present invention occurs over the subscriber loop plant 12. The average length of subscriber loop plants is approximately 10,000 feet. The insertion loss of the longest expected subscriber loop in a majority of cases will not exceed 40 dB in the 4 to 50 kHz frequency band. Thus, reliable data communication in this band over the hard wire lines of the subscriber loop plant can be achieved. Reliable communication may be maintained utilizing data signal levels of less than −40 dBm at the receiver locations. Such low level transmitter signals reduce the possibility of cross talk between cable pairs contained in the same cable jacket. It is, however, appreciated that difficulty may be encountered with subscriber loops that are loaded by, for example, lumped inductors. Such lines have a sharp frequency cutoff above 4 kHz which prevent data transmission in the frequency range of the present invention. It is noted, however, that the large majority of subscriber loop plants are unloaded facilities, the loaded loops being primarily located in rural areas.

In the normal operation of the telephone system illustrated in FIG. 1 a telephone handset such as 13-15 is exclusively either in the on-hook state or in the off-hook state. During the on-hook state the associated subscriber loop is terminated through the cutoff relay contacts by the field windings of the line relay. For example, the subscriber loop 17 of the on-hook telephone 14 is terminated through the contacts of the cutoff relay 32 by the line relay field windings 27. The conventional line circuit that shunts the subscriber loop in the on-hook state of the telephone is of sufficiently high impedance so that it presents little attenuation to the data signals in the frequency band of 4 to 50 kHz of the invention. During the off-hook state a subscriber loop is terminated during dialing by the supervision circuit 34 and the switch matrix 35, and after a connection is made by the subscriber loop of the called party. Because of the electro-acoustic response of the telephone receivers as discussed with respect to FIG. 2, the data signals transmitted in accordance with the invention are essentially inaudible in the telephone system. The data signals do not cause degradation of the normal voice signal transmission or reception resulting in no disruption of normal telephone voice communication service. Additionally, the telephone handset transmitter does not generate significant high frequency components so that interference between voice signals and data signals is minimized. Data signal levels at the data receiver of less than —40 dBm have been sufficient to prevent interference from loud voice signals and it is expected that even lower level data signals may be utilized. Thus it is appreciated that data communication between the transmitters and receivers of the invention may be continuously maintained during both the on-hook and off-hook states of the telephones without degradation to the voice communication function of the system and without interference between the data signals and the voice signals.

When a connection is made between two telephones of the system a problem may exist whereby the data signals from a particular transmitter may be connected to a receiver that is not associated therewith. For example, if a connection is made from the telephone 13 through the subscriber loop 16 to the central office 10 and then via the interoffice trunk 11 to another telephone connected with another central office, data signals generated at the transmitter 43 are not only properly received by the receiver 70 but also may be inadvertently received by the receiver associated with the other telephone. In this situation the two subscribers are separated by the two associated subscriber loops, the switch matrix 35 of the central office 10, the switch matrix of the other central office and the interconnecting interoffice trunk line 11. The length of the interoffice trunk line 11 is normally at least twice as long as the longest unloaded subscriber loop even for neighboring central offices. The added attenuation that one data signal incurs in passing through the interoffice trunk line is likely to be greater than 40 dB. The true signal may therefore be discriminated from the inadvertently received signal on the basis of amplitude. In addition, the trunk line is often a loaded facility or utilizes repeat coils. Such facilities have a sharp cutoff above 4 kHz as discussed above.

A similar problem exists when an intra-office connection is made between two subscribers connected to the same central office. For example, in FIG. 1 the subscriber telephones 13 and 15 are illustrated off-hook with a connection effected therebetween through the switch matrix 35. It is appreciated that data signals generated at the transmitter 43 are received not only at the associated data receiver 70 but also at the data receiver 72 associated with the subscriber telephone 15. A similar situation also exists for data signals emanating from the transmitter 45. Since the attenuation through the switch matrix 35 is small at the frequencies of the data signal transmissions, the interfering signals will be comparable in level to the true signals and discrimination therebetween on the basis of amplitude would be difficult. This problem is obviated by the series insertion of the low pass filters 23-25 at the bridge taps 64-66 respectively on the main distribution frame 21. The filters block the data signals while passing the voice signals. Accordingly, in the preferred embodiment of the invention these filters may have a high frequency cutoff of 4 kHz. For operation in the data signal range of 4 to 50 kHz the filters 23-25 may be designed quite small so that there would be a space limitation problem at the main distribution frame of the telephone company's central office.

Alternative solutions to the intra-office connection data signal interference problem are as follows:

Frequency division multiplexing may be utilized where each subscriber connected to the same central office is assigned a different operating frequency band.

Pulse synchronous detection may be utilized wherein pulse data transmission is used with the transmitters and receivers being gated on in synchronism.

Dual operating frequency bands may be utilized where all subscriber data transmitters and data receivers operate in two frequency bands, A and B. Normal operation may be in band A. The called party may detect the 20 cycle ringing frequency which may cause operation to switch to band B. Line circuit trip in or dial tone may cause reversion to operation in band A when the connection is broken.

From the foregoing it is appreciated that by utilizing the present invention most residences and business offices may be connected with a central monitoring station for continuous alarm monitoring and other special data services without the need for additional connecting lines. The operating frequencies for the data communication equipment are outside the standard telephone voice transmission frequency band and in the preferred embodiment, the operating frequency band is selected from 4 to 50 kHz. Because of the natural frequency selectivity of the telephone receiver as discussed above with respect to FIG. 2, the data signals are rendered inaudible and limitations of the telephone transmitter result in little energy being produced above 4 kHz so that high frequency interference caused by overtones generated by the telephone transmitter does not occur. The data transmitters and receivers by reason of their frequency selectivity do not load the voice signal so that voice quality is not affected in the presence of the data transmission equipment in the subscriber loop.

Figure 3:
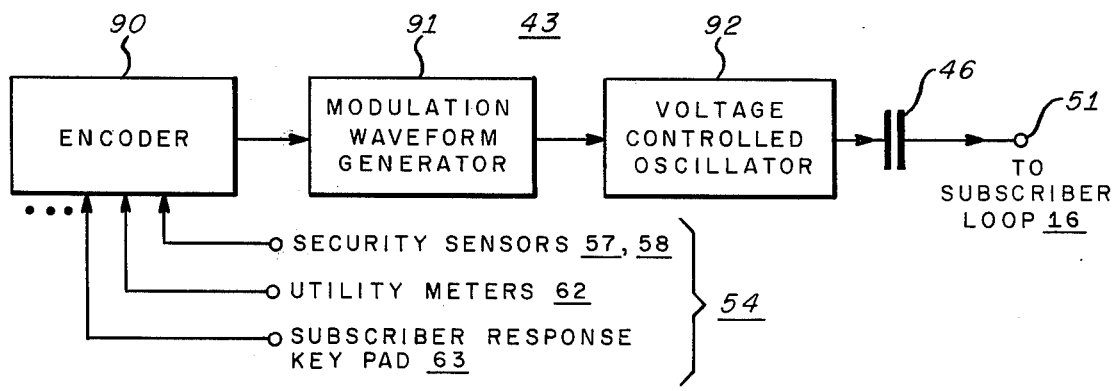
FIG. 3 is a schematic block diagram of a data transmitter for use in the system of FIG. 1.

The lower limit of 4 kHz for the data communication operating frequency band is chosen so as to be outside the standard telephone voice transmission frequency band of 200 to 3,000 Hz. The upper frequency limit of 50 kHz for the data communication operating frequency band is chosen to minimize insertion loss over the subscriber loop plant. Other data communication frequency bands may be utilized in practicing the invention with the limitation that they be outside the standard telephone voice transmission frequency band of the system in which the invention is utilized, the bandwidth of the data transmissions being chosen in accordance with the data rate required by the system. A wide variety of data transmitters and receivers may be utilized in practicing the invention. FIG. 3 illustrates a data transmitter that may be utilized in implementing the transmitters 43-45 of FIG. 1.

Referring now to FIG. 3 in which like reference numerals indicate like components with respect to FIG. 1, a data transmitter such as 43 is illustrated. The data transmitter 43 includes an encoder 90 coupled to receive data from the data sources 54 discussed with respect to FIG. 1. The encoder 90 conditions the signals from the data sensors, controls, meters and character generators (e.g. the keypad 63) located in the subscriber's residence or business office. The output of the encoder 90 is applied to a modulation waveform generator 91. The modulation waveform generator 91 provides a voltage waveform in accordance with the conditioned data from the encoder 90 in a manner to be described. The modulation waveform generator 91 applies its voltage waveform to a conventional voltage controlled oscillator 92.

The components of the data transmitter 43 are designed such that the voltage controlled oscillator 92 provides a variable frequency signal in the data communication frequency band of the system, which in the preferred embodiment is from 4 to 50 kHz. The modulation waveform generator 91 provides the voltage waveform to frequency modulate the data carrier signal provided by the oscillator 92.

Figure 4:
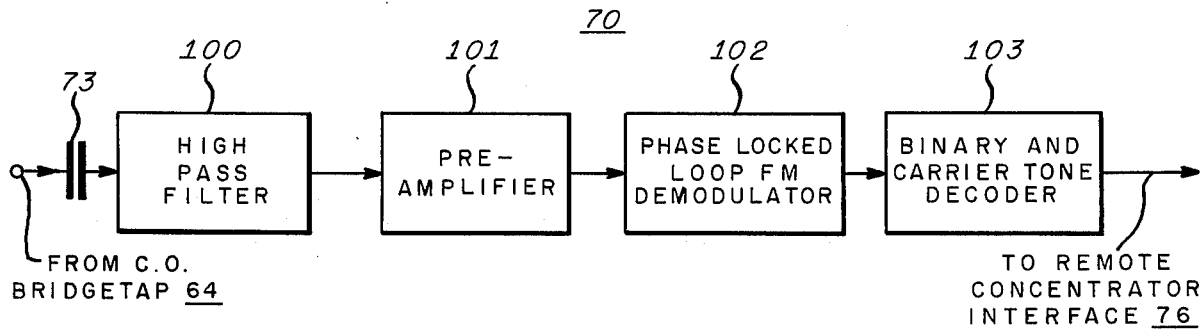
FIG. 4 is a schematic block diagram of a data receiver for use in the system of FIG. 1.

The output from the voltage controlled oscillator 92 is coupled to the bridge tap 51 on the subscriber loop 16 through the capacitor 46 which prevents the flow of d.c. current from the transmitter 43 into the local subscriber loop 16. As previously described with respect to FIG. 1, the data signals provided by the transmitters 43, 44 and 45 are transmitted along the subscriber loops 16, 17 and 18 to the data receivers 70, 71 and 72 respectively. FIG. 4 illustrates apparatus that might be utilized in instrumenting the data receivers of the system such as the receiver 70.

Referring now to FIG. 4 in which like reference numerals indicate like components with respect to FIG. 1, the data receiver 70 includes a conventional high pass filter 100 which is coupled to receive the data signals from the bridge tap 64 through the d.c. blocking capacitor 73. The receiver 70 is tuned to respond to frequencies above 4 kHz by the filter 100 so that all voice and ringing signals produced during normal telephone service is blocked from the receiver. The filter 100 is designated to provide greater than 40 dB attenuation to signals below 4 kHz and greater than 100 dB isolation at the 20 Hz ringing frequency so that high level voice signals and the large amplitude ringer voltage of 100 volts do not interfere with the data signal or endanger the circuits of the receiver 70.

The output of the high pass filter 100 is applied to a conventional preamplifier 101 wherein the data signals in the frequency range above 4 kHz are amplified. The filtered and amplified data signals are applied to a conventional phase-locked loop f.m. demodulator 102 that locks onto and demodulates the data signal in a well known manner. The demodulator 102 provides the f.m. modulation signal imposed upon the data signal carrier by the modulation waveform generator 91 of FIG. 3. The phase-locked loop f.m. demodulator 102 compensates for small changes in the transmitter frequency due to temperature drift or component aging remaining locked to the transmitted signal thereby providing proper operation of the equipment.

The output of the f.m. demodulator 102 is applied to a binary and carrier tone decoder 103. The decoder 103 decodes the various modulation signals from the demodulator 102 to provide the received data to the remote data concentrator interface 76 of FIG. 1 in a manner to be explained.

With reference to FIGS. 3 and 4 for fail-safe operation the transmitter 43 continuously emits a carrier signal, the frequency of the carrier conveying security status. Loss of the carrier signal causes an alarm to be generated by the remote data concentrator 77 (FIG. 1) indicating a break in the communication line or equipment failure. This results in immediate action at the central monitoring station 81 (FIG. 1), to localize the problem. A police alert is also initiated in the event deliberate tampering of the communication line is indicated.

A permanent shift in the carrier frequency from the transmitter 43 indicates the specific alarm condition, i.e. burglar, fire, emergency (ambulance assistance), etc. The carrier frequency is only restored after reset of the alarm sensor. Discrete signals such as might be obtained from utility meter counts will cause a momentary shift in the carrier frequency from the transmitter 43. Other signals are transmitted by serially coding the carrier either by on-off modulation of the carrier or by frequency shift keying using start-stop bit asynchronous modulation. When frequency shift keying modulation is utilized, the voltage controlled oscillator 92 of the transmitter 43 is modulated by a binary (or $m$-ary) signal of prescribed amplitude. The output from the voltage controlled oscillator 92 utilizing this modulation is a two-level (or $m$-level) frequency shift modulation. Alternatively, modulation may also be performed by phase shift keying, multitone modulation or the like. The appropriate modulation waveform is applied by the modulation waveform generator 91 to the voltage controlled oscillator 92 in the data transmitter 43.

The center frequency tuning of the voltage controlled oscillator 92 is controlled by contact closure of the security sensor. Thus, for example, if the burglar alarm is tripped, the open contact of the sensor will cause the voltage controlled oscillator 92 to change to a predetermined frequency. This change is decoded in the carrier tone decoder 103 in the data receiver 70. The data concentrator 77 (FIG. 1) forwards this information to the monitoring center 81 where it is recorded and appropriate action is initiated.

The binary (or $m$-ary) coded signals detected on the security carrier by the binary decoder 103 of the receiver 70 are stored in a buffer (now shown) in the remote data concentrator 77. The remote data concentrator computer 77 scans its buffers at regular intervals and relays their contents to the central monitoring station 81. In this manner subscriber responses, for example from a keypad, to questions posed by television or radio broadcasters are tabulated and relayed to the broadcasters.

Momentary carrier frequency changes indicating discrete metering signals are decoded and processed in the remote data concentrator 77 for later retreival by the monitoring station 81. The processed metering signals for each subscriber are transmitted on request to the monitoring center 81 at periodic intervals and provide the basis for utility company billing.

Specifically, with regard to FIGS. 1, 3 and 4, a plurality of security sensors might be located at the residence or business office of the subscriber. For example, a normally closed contact might be opened upon the entry of an intruder. Another normally closed contact might be opened in response to a heat sensor for detecting fire. Security sensor switches of this nature are applied to respective inputs to the encoder 90. Another input of the encoder 90 may be provided from a utility meter such as the kilowatt hour electric meter. Whenever a predetermined amount of electricity has flowed through the meter, an electrical contact therein may be momentarily closed to indicate this usage of the electrical power. Another input to the encoder 90 may be provided by a subscriber response keypad. The keypad may provide binary coded pulses in accordance with the data entered therein by the subscriber.

These contacts and signals are conditioned by conventional networks in the encoder 90 to provide signals that cause the modulation waveform generator 91 to provide appropriate modulation waveform voltages to the voltage controlled oscillator 92. For example, in the absence of any data to be transmitted, the encoder 90 causes the modulation waveform generator 91 to provide a predetermined d.c. level corresponding to a no-alarm and a no-data situation. The d.c. level from the modulation waveform generator 91 causes the voltage controlled oscillator 92 to provide a carrier at a predetermined frequency to the subscriber loop 16. The frequency is chosen outside the standard telephone voice transmission frequency band of the system and in the preferred embodiment of the invention the frequency is chosen within the band of from 4 to 50 kHz. When the contact of a security sensor, for example a burglar sensor, is opened, the encoder 90 provides a signal to the modulation waveform generator 91 to switch from the normal d.c. level to another d.c. level representative of the type of alarm to be sounded. The new d.c. level causes the voltage controlled oscillator 92 to switch to another frequency within the data communication band, this frequency being representative of the type of alarm.

When a utility meter signal is received by the encoder 90, a signal is in turn applied to the modulation waveform generator 91 to superimpose a pulse of a predetermined amplitude on the d.c. level provided by the generator 91. This pulse of predetermined amplitude causes the voltage controlled oscillator 92 to momentarily shift its frequency from the normal carrier to a frequency representative of the particular utility meter to provide an f.m. pulse. In a similar manner, binary data from the keypad pulse modulates the d.c. level from the modulation waveform generator 91 to provide f.m. pulses from the voltage controlled oscillator 92 of frequencies representative of the type of data input.

The continuous frequency tones representative of normal operation and of security alarms are demodulated in the phase-locked loop f.m. demodulator 102 of the receiver 70 to provide d.c. levels representative of the normal operation and of the alarms. In a similar manner, the demodulator 102 provides the utility meter pulses and the keypad response pulses generated by the transmitter 43. The binary and carrier tone decoder 103 receives these d.c. levels and by conventional comparison circuits provides signals representative of the alarms to the remote data concentrator interface 76. The decoder 103 also decodes the binary and utility meter pulses by conventional pulse detector circuitry to provide the appropriate data signals to the remote data concentrator interface 76.

When it is desired to utilize an increased degree of fail-safe operation, the d.c. levels from the modulation waveform generator 91 may be square wave modulated to provide the additional fail-safe performance of an active circuit.

It will be appreciated from the foregoing that although data communication has been explained in terms of transmission from a subscriber telephone handset through a telephone company central office and then to a remote data concentrator and central monitoring station, data communication in the reverse direction may be effected by utilizing a data transmitter at the location 67 and a data receiver at the location of the subscriber telephone handset.

While the invention has been described in its preferred embodiment, it should be understood that the words which have been used are words of description rather than limitation and that changes within the purview of the appended claims may be made without departing from the true scope and spirit of the invention in its broader aspects.

What is claimed is:

1. A data communication system for use with the public telephone voice communication system including a plurality of telephone company central offices each with switching matrix means, inter-office trunk line means inter-coupling said switching matrix means of said central offices, a plurality of subscriber telephones associated with each central office, a subscriber loop plant having a plurality of subscriber loops connecting said telephones with said associated central office respectively, the data communication system comprising:

data sources at the locations of said telephones respectively for providing date to be transmitted, data transmitters at the locations of said telephones respectively having inputs coupled to said data sources for receiving said data to be transmitted and having respective outputs for providing data signals representative of said data at frequencies above the standard telephone voice transmission frequency band of said telephone system, first bridge taps connected to said subscriber loops at the locations of said telephones respectively, first capacitors coupling said outputs of said transmitters to said first bridge taps respectively, thereby coupling said data signals to said subscriber loops respectively, second bridge taps connected to said subscriber loops respectively at said central offices, second capacitors coupled to said second bridge taps respectively, data receivers at the locations of said central offices having inputs coupled through said second capacitors to said second bridge taps respectively for receiving said data signals and having outputs for providing received data corresponding to said received data signals.

low pass filters coupled between said second bridge taps respectively and said switching matrix means at said central offices for passing frequencies within said standard telephone voice transmission frequency band and for blocking frequencies of said data signals thereby preventing erroneous transmission of data through said switching matrix means between transmitters and receivers associated with the same central office but not associated with each other, data concentrator computers at the locations of said central offices respectively having inputs coupled to said outputs of said data receivers for processing said received data, a central monitoring station for receiving and distributing said processed data, and telephone lines coupling said data concentrator computers to said central monitoring station for conveying said processed data thereto.

2. The apparatus of claim 1 in which each said transmitter comprises a modulation waveform generator responsive to said data for providing voltage waveforms in accordance therewith, and a voltage controlled oscillator coupled to said modulation waveform generator for providing said data signals frequency modulated in accordance with said voltage waveforms.

3. The apparatus of claim 2 in which each said transmitter further includes encoder means coupled between said data sources and said modulation waveform generator for conditioning said data.

4. The apparatus of claim 2 in which each said receiver comprises an f.m. demodulator for demodulating said frequency modulated data signals thereby providing said received data.

5. The apparatus of claim 4 in which said f.m. demodulator comprises a phase-locked loop f.m. demodulator.

6. The apparatus of claim 5 in which said receiver further includes decoder means coupled to said f.m. demodulator to provide said received data.

* * * * *